July 23, 1929. C. S. WATKINS 1,721,679
COMBINED DEMOUNTABLE RIM AND WHEEL FOR AUTOMOBILES AND OTHER VEHICLES Filed Jan. 15, 1923

Patented July 23, 1929.

1,721,679

UNITED STATES PATENT OFFICE.

CLAYTON STUART WATKINS, OF WICHITA FALLS, TEXAS.

COMBINED DEMOUNTABLE RIM AND WHEEL FOR AUTOMOBILES AND OTHER VEHICLES.

Application filed January 15, 1923. Serial No. 612,722.

The invention relates to a combined demountable rim and wheel for automobiles and other vehicles comprising a very simple and practical arrangement, providing means of applying or removing the rim from the wheel very quickly.

Another object of this invention is to provide a device of this nature which is very strong and rigid and will withstand unusual wear.

Another object of this invention is to provide a device of this character which is very simple and practical and can be used as an accessory or a part of a manufactured vehicle. The device can be manufactured and sold at a very nominal cost.

The nature and advantages of the invention will be better understood when the following detailed description is read in connection with the accompanying drawing forming a part of this application. The invention resides in the construction, combination and arrangement of parts as claimed.

In the accompanying drawing the various parts will be referred to by numbers. And, Figure 1 is a side view.

Figure 1:
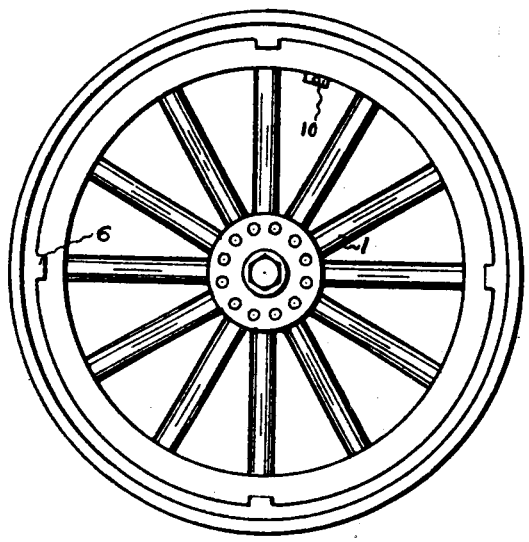
Figure 2:
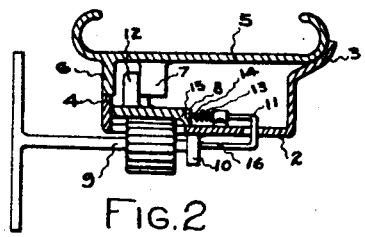
Figure 2 is a sectional view.
Figure 3:
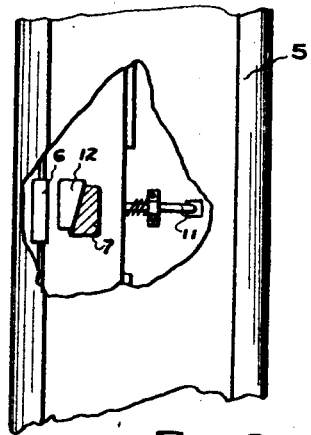
Figure 3 is a top view.

The device forming the subject matter of this invention comprises a wheel 1, of any suitable design, a felloe band 2, a flange 3 forming a part of the felloe band 2, a flange 4 also forming a part of the felloe band and a rim 5, of any suitable design, having four or more flanges 6 arranged thereon. The numerals 7—7 denote four or more slanting lugs securely attached to the rim 5. 8 is a ring arranged in the felloe band 2, having a plurality of teeth on the inner face thereof. The numeral 9 denotes a gear wrench designed for association with the teeth of the ring 8. 10 is a support for the gear wrench 9. 11 is a locking device to prevent the ring 8 from coming loose when placed in any desired position. The numerals 12—12 denote four or more slanting lugs arranged on the ring 8 designed for cooperation with the lugs 7 on the rim 5. It will be noted that the gear wrench 9 is removable. It will also be noted that the locking device 11 operates automatically. When the gear wrench 9 is removed the coil spring 13 forces the rod 14 into the hole 15 of the ring 8. It will also be noted that the rod 14 forms a part of the rod 16. When the gear wrench 9 is placed in position for use one end of the shaft of said gear wrench is placed in the support 10, pushing the rod 16 in a direction that removes the rod 14 from the hole 15 in the ring 8. When the gear wrench 9 is turned in a certain direction the lugs 12 and 7 are disengaged, thus permitting the rim 5 to be quickly removed. When the rim 5 is placed on the felloe band 2 and the gear wrench 9 turned in a certain direction the slanting lugs 12 and 7 become engaged and press the rim 5 against the flange 3 of the felloe band 2. When the gear wrench 9 is removed the spring 13 inserts the rod 14 in the hole 15 of the ring 8, thus holding the rim 5 securely in place. The flanges 6 hold the rim 5 stationary on the felloe band 2 while the lugs 12 on the ring 8 are engaged with the lugs 7 on the rim 5.

While it is believed from the foregoing description the nature and advantages of the device will be readily apparent, I desire to have it understood that I do not limit myself to what is herein shown and described, and that such changes may be resorted to, when desired, as fall within the scope of what is herein claimed.

What I claim is:

In combination, a wheel having a felloe band with flanges to support a rim, a peripheral band, said band having rim engaging portions intermediate said flanges, said band also provided with notches, designed to be engaged by a suitable tool to cause a rotation of said band there being a slot in said band, a transversely slidable member having one end insertable into the slot in said band, a support for said slidable member, a spring for urging said slidable member into inserted position, said slidable member being of a U-shape and adapted to be actuated from its other end to be disengaged from said slots, and a rim having members engaged by said rim engaging portions upon said band.

CLAYTON STUART WATKINS.